United States Patent
Morris et al.

(10) Patent No.: US 11,635,391 B2
(45) Date of Patent: *Apr. 25, 2023

(54) SYSTEMS AND METHODS FOR INSPECTING PIPELINES USING A PIPELINE INSPECTION ROBOT

(71) Applicant: Mistras Group, Inc., Princeton, NJ (US)

(72) Inventors: Kelly Morris, Anchorage, AK (US); Elliott Morris, Anchorage, AK (US); John Musgrave, Anchorage, AK (US)

(73) Assignee: Mistras Group, Inc., Anchorage, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,097

(22) Filed: Oct. 11, 2021

(65) Prior Publication Data
US 2022/0026374 A1 Jan. 27, 2022

Related U.S. Application Data

(63) Continuation of application No. 16/208,466, filed on Dec. 3, 2018, now Pat. No. 11,143,599.

(51) Int. Cl.
*G01N 21/954* (2006.01)
*B64C 39/02* (2023.01)
(Continued)

(52) U.S. Cl.
CPC ......... *G01N 21/954* (2013.01); *B64C 39/024* (2013.01); *G05D 1/0088* (2013.01);
(Continued)

(58) Field of Classification Search
None
See application file for complete search history.

(56) References Cited

U.S. PATENT DOCUMENTS 3,495,626 A 2/1970 Nagel
5,698,854 A 12/1997 Gupta
(Continued)

FOREIGN PATENT DOCUMENTS

CA 2132515 C 1/2006
CN 106094617 A 11/2016
(Continued)

OTHER PUBLICATIONS

Tavakoli et al., "3DCLIMBER: Climbing and manipulation over 3D structures," Mechatronics, vol. 21, No. 1, 2011, pp. 48-462, ISSN 0957-4158 (Year: 2011).
(Continued)

*Primary Examiner* — Stuart D Bennett
(74) *Attorney, Agent, or Firm* — Norton Rose Fulbright US LLP

(57) ABSTRACT

Systems and methods for robotic inspection of above-ground pipelines are disclosed. Embodiments may include a robotic crawler having a plurality of motors that are individually controllable for improved positioning on the pipeline to facilitate image acquisition. Embodiments may also include mounting systems to house and carry imaging equipment configured to capture image data simultaneously from a plurality of angles. Such mounting systems may be adjustable to account for different sizes of pipes (e.g., 2-40+ inches), and may be configured to account for traversing various pipe support structures. Still further, mounting systems may include quick-release members to allow for removal and re-mounting of imaging equipment when traversing support structures. In other aspects, embodiments may be directed toward control systems for the robotic crawler which assist in the navigation and image capture capabilities of the crawler.

20 Claims, 17 Drawing Sheets

(51) Int. Cl.
    *G05D 1/00*     (2006.01)
    *G06V 10/24*    (2022.01)
(52) U.S. Cl.
    CPC ........ *G06V 10/24* (2022.01); *B64C 2201/123* (2013.01); *G01N 2021/9542* (2013.01)

(56) References Cited

U.S. PATENT DOCUMENTS

| | | | |
|---|---|---|---|
| 5,857,534 | A | 1/1999 | DeVault et al. |
| 5,963,030 | A | 10/1999 | Stark |
| 7,656,997 | B1 | 2/2010 | Anjelly |
| 8,759,780 | B2 | 6/2014 | Dobbs |
| 9,863,919 | B2 | 1/2018 | Carrasco Zanini et al. |
| 9,874,507 | B2 * | 1/2018 | Dingman .............. G05D 1/0011 |
| 9,927,354 | B1 | 3/2018 | Starr et al. |
| 2004/0211272 | A1 | 10/2004 | Aronstam et al. |
| 2005/0041775 | A1 | 2/2005 | Batzinger et al. |
| 2005/0217394 | A1 | 10/2005 | Langley et al. |
| 2006/0078091 | A1 | 4/2006 | Lasiuk et al. |
| 2007/0000406 | A1 | 1/2007 | Stout |
| 2009/0120215 | A1 * | 5/2009 | Jacobson ............. G05D 1/0891 701/23 |
| 2010/0211354 | A1 | 8/2010 | Park et al. |
| 2010/0218624 | A1 | 9/2010 | Atwood et al. |
| 2011/0025608 | A1 | 2/2011 | Kruglick |
| 2012/0197439 | A1 | 8/2012 | Wang et al. |
| 2012/0197440 | A1 | 8/2012 | Farkavek et al. |
| 2012/0256643 | A1 | 10/2012 | Langley et al. |
| 2013/0014598 | A1 | 1/2013 | Langley et al. |
| 2013/0325768 | A1 | 12/2013 | Sinyavskiy et al. |
| 2014/0146161 | A1 * | 5/2014 | Sibai ........................ B25J 5/007 348/84 |
| 2014/0207406 | A1 | 7/2014 | Domke et al. |
| 2014/0338472 | A1 | 11/2014 | Chang |
| 2016/0084967 | A1 | 3/2016 | Nygard |
| 2016/0177540 | A1 | 6/2016 | Penza et al. |
| 2016/0245718 | A1 * | 8/2016 | Chan ........................ G01M 3/38 |
| 2016/0369934 | A1 | 12/2016 | Penza et al. |
| 2017/0131214 | A1 | 5/2017 | Gutiérrez Pérez et al. |
| 2017/0191601 | A1 | 7/2017 | Sever |
| 2017/0205230 | A1 | 7/2017 | Send et al. |
| 2018/0178811 | A1 | 6/2018 | Ohta |
| 2018/0180733 | A1 | 6/2018 | Smits |
| 2018/0202944 | A1 | 7/2018 | Sanchez et al. |
| 2018/0313715 | A1 | 11/2018 | Cichosz et al. |
| 2019/0086020 | A1 * | 3/2019 | Wehlin .................... B60K 1/00 |
| 2019/0339209 | A1 | 11/2019 | Du |
| 2020/0011995 | A1 | 1/2020 | Send et al. |

FOREIGN PATENT DOCUMENTS

| | | | |
|---|---|---|---|
| CN | 108488539 | A | 9/2018 |
| CN | 108693535 | A | 10/2018 |
| CN | 207983366 | U | 10/2018 |
| CN | 107339546 | B | 6/2019 |
| EP | 2718741 | A1 | 4/2014 |
| JP | H11194101 | A | 7/1999 |
| JP | 3296648 | B2 * | 7/2002 ............. G10H 1/125 |
| JP | 2011149701 | A | 8/2011 |
| JP | 2018105494 | A | 7/2018 |
| KR | 20040001686 | A | 1/2004 |
| KR | 101290794 | B1 | 7/2013 |
| WO | WO-02056255 | A2 | 7/2002 |
| WO | WO-2014098068 | A1 | 6/2014 |
| WO | WO-2015024080 | A1 | 2/2015 |
| WO | WO-2015063483 | A1 | 5/2015 |
| WO | WO-2015/172231 | A1 | 11/2015 |
| WO | WO-2016/049645 | A1 | 3/2016 |
| WO | WO-2018064159 | A1 | 4/2018 |

OTHER PUBLICATIONS

Yukawa et al. "Magnetic Part Design of Pipe-Surface Inspection Robot," IEEE 32nd Annual Conference on Industrial Electronics, Nov. 2006, 6 pages.

Extended European Search Report issued for European Patent Application No. 19212415.4, dated May 4, 2020, 10 pages.

Extended European Search Report issued for European Patent Application No. 19212486.5, dated Apr. 17, 2020, 9 pages.

European Patent Office, Communication, Extended European Search Report issued for European Patent Application No. 20191770.5, dated Feb. 26, 2021, 9 pages.

European Patent Office, Communication Pursuant to Article 94(3) EPC issued for European Application No. 19212415.4, dated May 26, 2021, 6 pages.

* cited by examiner

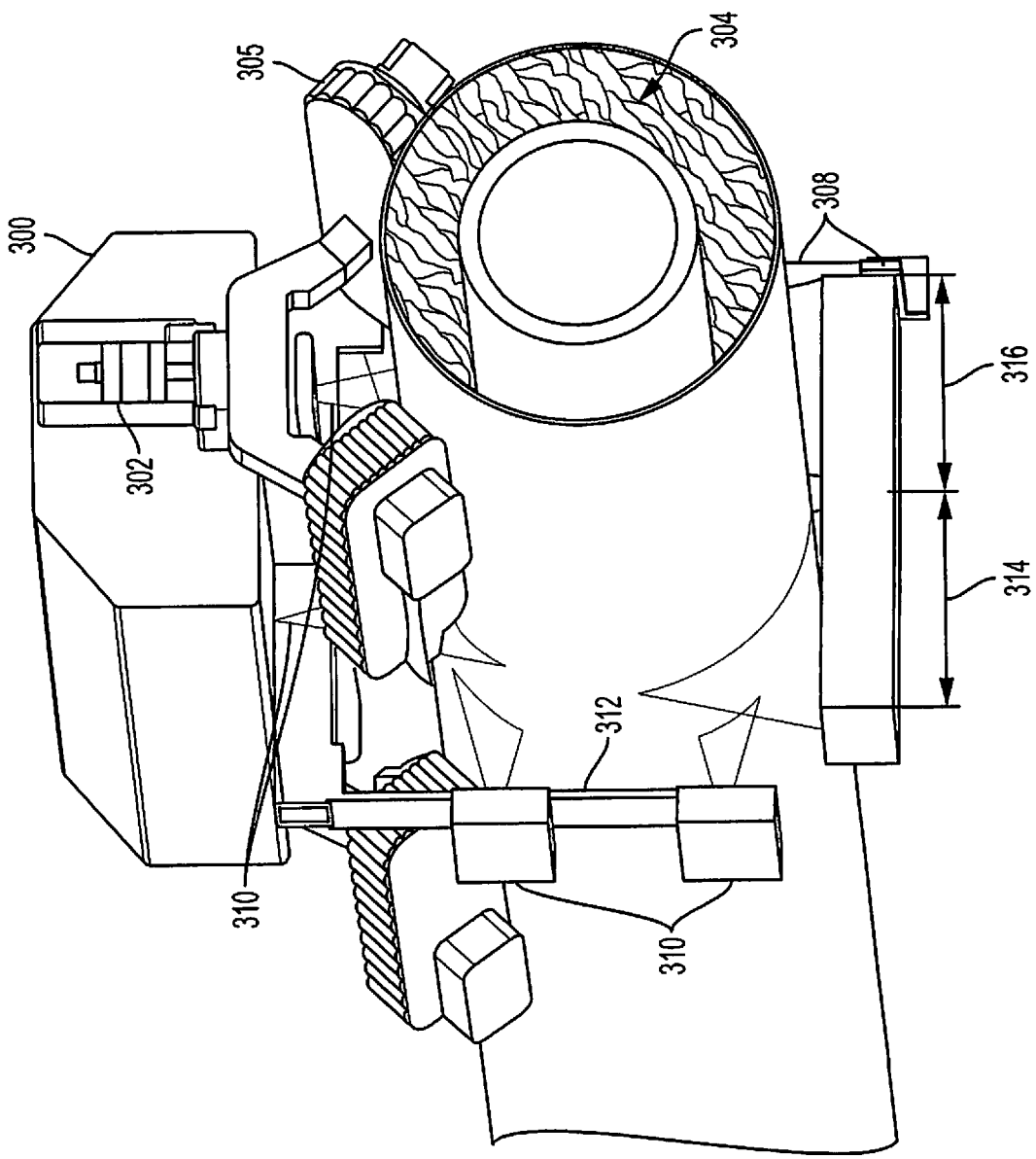

SYSTEMS AND METHODS FOR INSPECTING PIPELINES USING A PIPELINE INSPECTION ROBOT

CROSS-REFERENCE TO RELATED APPLICATION

The present application is a continuation of U.S. patent application Ser. No. 16/208,466 filed Dec. 3, 2018 and entitled "SYSTEMS AND METHODS FOR INSPECTING PIPELINES USING A PIPELINE INSPECTION ROBOT," the disclosure of which is incorporated by reference herein in its entirety.

TECHNICAL FIELD

Aspects of the present disclosure relate generally to inspection of above ground pipelines, and more particularly, to systems and methods for creating and utilizing a robot for pipeline inspection.

BACKGROUND

Above ground pipelines develop internal corrosion as well as corrosion underneath insulation ("CUI") on the exterior of the pipe. CUI typically occurs due to a moisture buildup on the external surface of insulated equipment. The corrosion itself is most commonly galvanic, chloride, acidic, or alkaline corrosion. If undetected, the results of CUI can lead to leaks, the eventual shutdown of a pipeline, and in rare cases it may lead to a safety incident. Accordingly, it is important to periodically inspect above ground pipelines for the presence of corrosion.

Current methods of inspecting above ground pipelines have typically entailed the erection of scaffolding, hazardous usage of radiation sources, and/or use of imaging equipment mounted on poles and positioned by hand to inspect and image the pipeline. Moreover, existing inspection methods generally require multiple series of images to be acquired to capture multiple angles of view by performing multiple traversals of the pipeline. These manual methods are labor intensive, time consuming, and costly to entities inspecting their pipelines.

Previous attempts to improve the inspection process have involved a semi-automated collar system with a vehicle mounted to a top of the pipeline. Resulting imagery from such a system has taken the form of a video or series of film-type images for a single view of the pipeline. Such imagery is also time and labor intensive to review as it requires a user to examine the entire video and/or long series of images. Additionally, multiple views of the pipeline are still needed in order to properly inspect the pipeline. Similar to manual techniques, these collar systems also require multiple traversals of the pipeline to obtain these views, which also results in multiple sets of data to be reviewed. These systems also suffer from further practical issues which hinder usage. For example, radiation sources and imaging techniques employed with the collar system require a large exclusion zone to be utilized where technicians must not enter while collecting images due to hazardous radiation sources employed in the imaging techniques. The imaging systems are also heavy, which hinders the operability of the respective vehicle.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present application discloses systems and methods for robotic inspection of above-ground pipelines. Embodiments may include a robotic crawler having a plurality of motors that are individually controllable for improved positioning on the pipeline to facilitate image acquisition. Embodiments may also include mounting systems to house and carry imaging equipment configured to capture image data simultaneously from a plurality of angles. Such mounting systems may be adjustable to account for different sizes of pipes (e.g., 2-40+ inches), and may be configured to account for traversing various pipe support structures. Still further, mounting systems may include quick-release members to allow for removal and re-mounting of imaging equipment when traversing support structures. In other aspects, embodiments may also be directed toward control systems for the robotic crawler which assist in the navigation and image capture capabilities of the crawler.

In accordance with one embodiment, a pipeline inspection robot is provided. The robot may include a housing compartment having one or more drive control systems, imaging control systems, and power supply components. The robot may further include a plurality of tracks configured to contact a pipe under inspection and to support the robot on an external surface of the pipe under inspection. Additionally, the robot may include a plurality of motors configured to drive the plurality of tracks, wherein at least two of the plurality of motors are controlled separately by the one or more drive control systems, and at least one mounting component configured to attach one or more imaging components configured to capture imaging data for the pipe inspection.

In accordance with another embodiment of the present application, a method for inspecting an above-ground pipeline is provided. The method may include one or more of the steps of: mounting an inspection crawler on a pipeline under inspection, said inspection crawler including a plurality of motors configured to drive a plurality of tracks in order to move the crawler; individually controlling the plurality of motors to cause the crawler to traverse the pipeline; adjusting the speed of one or more of the plurality of motors while traversing the pipeline to maintain spatial orientation of the crawler in order to capture image data from a plurality of azimuths; and stopping the plurality of motors and removing the crawler from the pipeline when the inspection imaging data is captured.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3B is another perspective view of a pipeline inspection robot according to some embodiments of the present disclosure.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to inspection of above ground pipelines. A pipeline inspection robot is disclosed that is configured to convey one or more transmission sources (e.g., X-ray tubes) with one or more detectors (e.g., linear detectors) to capture images of a pipeline. The robot (also referred to as crawler) may include a plurality of motors that are individually controlled in order to allow the robot to maintain ideal positioning for the imaging system. Further, the robot may include releasable features which allow for the removal and reattachment of imaging components to assist in the inspection process. Improvements and advantages exhibited by the pipeline inspection robot include better handling of the robot, the ability to inspect a pipeline with reduced passes of the robot (and in some instances in a single pass), the ability to utilize robotic inspection over pipe support structures, and the ability to releasably attach and detach components to overcome pipeline obstacles encountered during an inspection process.

Figure 1:
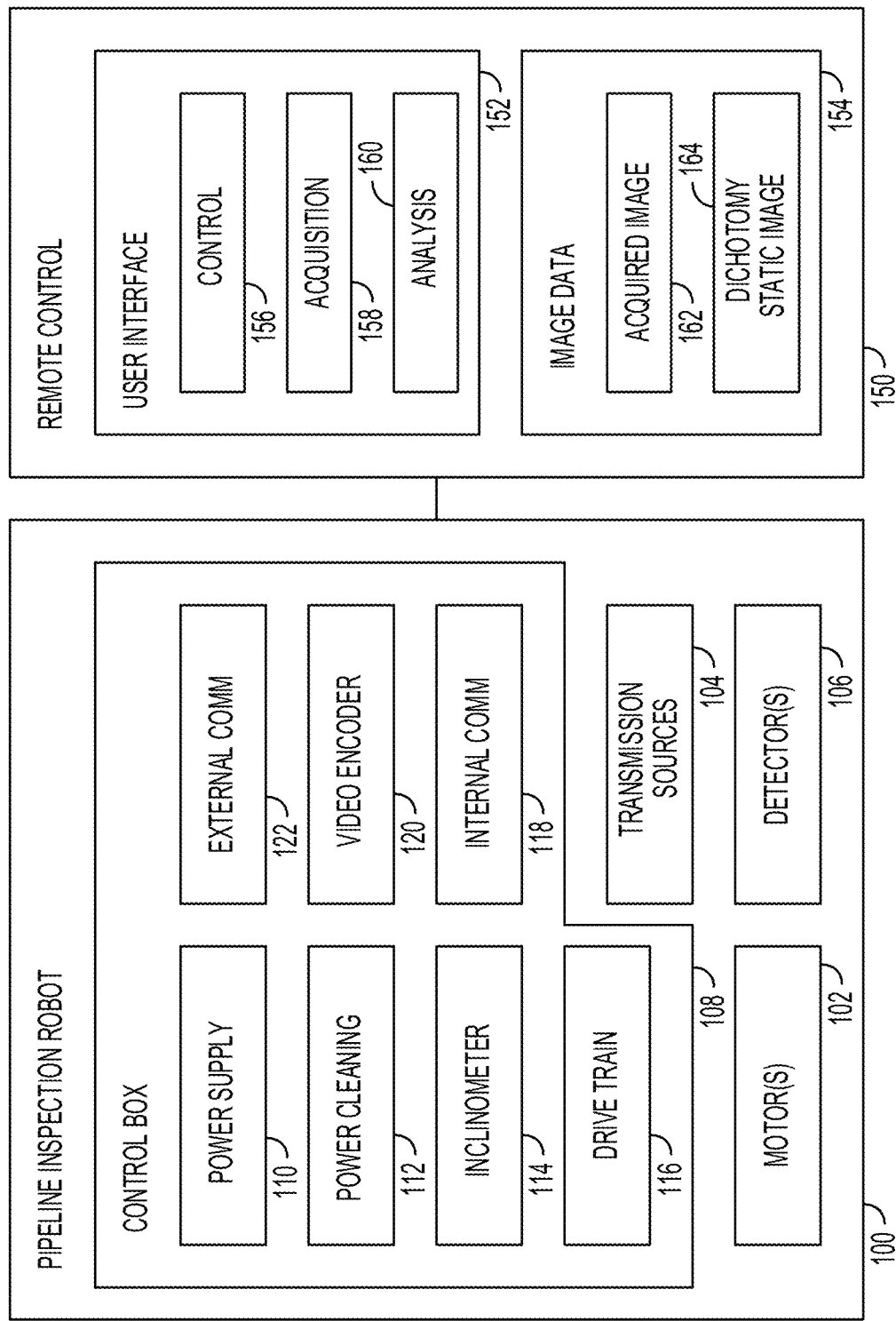
FIG. 1 is a block diagram illustrating details of a pipeline inspection robot and remote control equipment according to some embodiments of the present disclosure.

Referring to FIG. 1, a pipeline inspection robot 100 and remote control equipment 150 have various components. For example, the pipeline inspection robot 100 may have one or more motors 102, such as motors connected to drive tracks that move the robot to traverse the pipeline. Alternatively or additionally, the motors may drive other types of traversal mechanisms, such as wheels, hands, feet, claws, teeth, propeller, wing, winch, fin or any other type of mechanism that can be used to motivate traversal of a horizontal or non-horizontal pipeline. Motors 102 may also include one or more of encoders or resolvers to provide feedback to control equipment. Additionally, the pipeline inspection robot may have one or more imaging transmission sources 104 (e.g., X-ray tubes) and one or more detectors 106, such as linear detectors (collectively referred to as imaging components). Further, the pipeline inspection robot may have a control box 108.

Control box 108 of pipeline inspection robot 100 may have various components, such as power supply circuitry 110 and power cleaning circuitry 112 to supply power to other components. Power supply circuitry may be connected to an external power or a generator source. Inclinometer 114 may be included to sense and correct the relative placement of the robot on the pipeline in such a way that it stays on top of the pipeline and levels, orients, and/or centers the robot automatically throughout traversal of the pipeline. Motor controller 116 may operate the motors 102 according to input from the inclinometer and other input from an operator that determines a speed and direction of travel for the robot to both drive the robot and to make orientation corrections to the robot. It is appreciated that the orientation and level of the robot may be desired to be maintained in as much of a constant position as possible, such maintenance is better for uniform imaging and for the safety of the robot itself. Internal communication circuitry 118 may relay signals between the components of the control box 108. A video encoder 120 may be provided with one or more cameras that may be disposed to capture images in an inspection area in a vicinity of the robot. The video encoder 120 may perform some preprocessing of the captured images to encode one or more video streams. Images captured at detectors 106 may be processed and/or encoded by separate processing circuitry within robot 100 or such data may also be processed within video encoder 120. It is appreciated that the video encoder is generally utilized when the image capture devices are in video format and the use of digital still cameras would generally obviate the need for encoder 120. Alternatively, imaging data captured at detectors 106 may be remotely processed as discussed in more detail below wither with control box 108 or at a remote station. External communication circuitry 122 may provide wired or wireless communication with remote control equipment 150.

Components of remote control equipment 150 may include a user interface 152 and image data storage 154. In turn, user interface 152 may have a control interface 156 for controlling movement of the robot, and an image acquisition interface 158 that controls acquisition of image data 162 acquired by the robot, display of the image data 162 in a scrolling fashion, and conversion of the acquired image data into a static image, such as a Digital Imaging and Communication in Non-Destructive Evaluation (DICONDE) static image 164. Additionally, user interface 152 may include components 160 for processing and/or analyzing the static image. The illustrated interfaces comprise custom designed robot control software and image acquisition and display software. The robot control software using feedback from the motor encoders or resolvers, axle encoders and inclinometer controls speed and position of the robot on the pipeline and precisely matches the speed of the robot with the acquisition speed of a linear detector. It may also precisely index distance if a field array is used.

Additional details regarding the robot 100 and remote control equipment 150 are provided below with respect to certain embodiments described with reference to FIGS. 3-18. It is also appreciated that while various aspects are illustrated as separate functional blocks, each of these aspects may utilize either separate or combined computing resources such as processors, memories, etc. Still further details regarding mechanical and electro mechanical aspects of the robot 100 may be found in U.S. patent application Ser. No. 16/208,459, filed Dec. 3, 2018 and issued Sep. 22, 2020 as U.S. Pat. No. 10,783,623. The disclosure of the above-referenced application is incorporated by reference herein in its entirety for any and all purposes.

Figure 2:
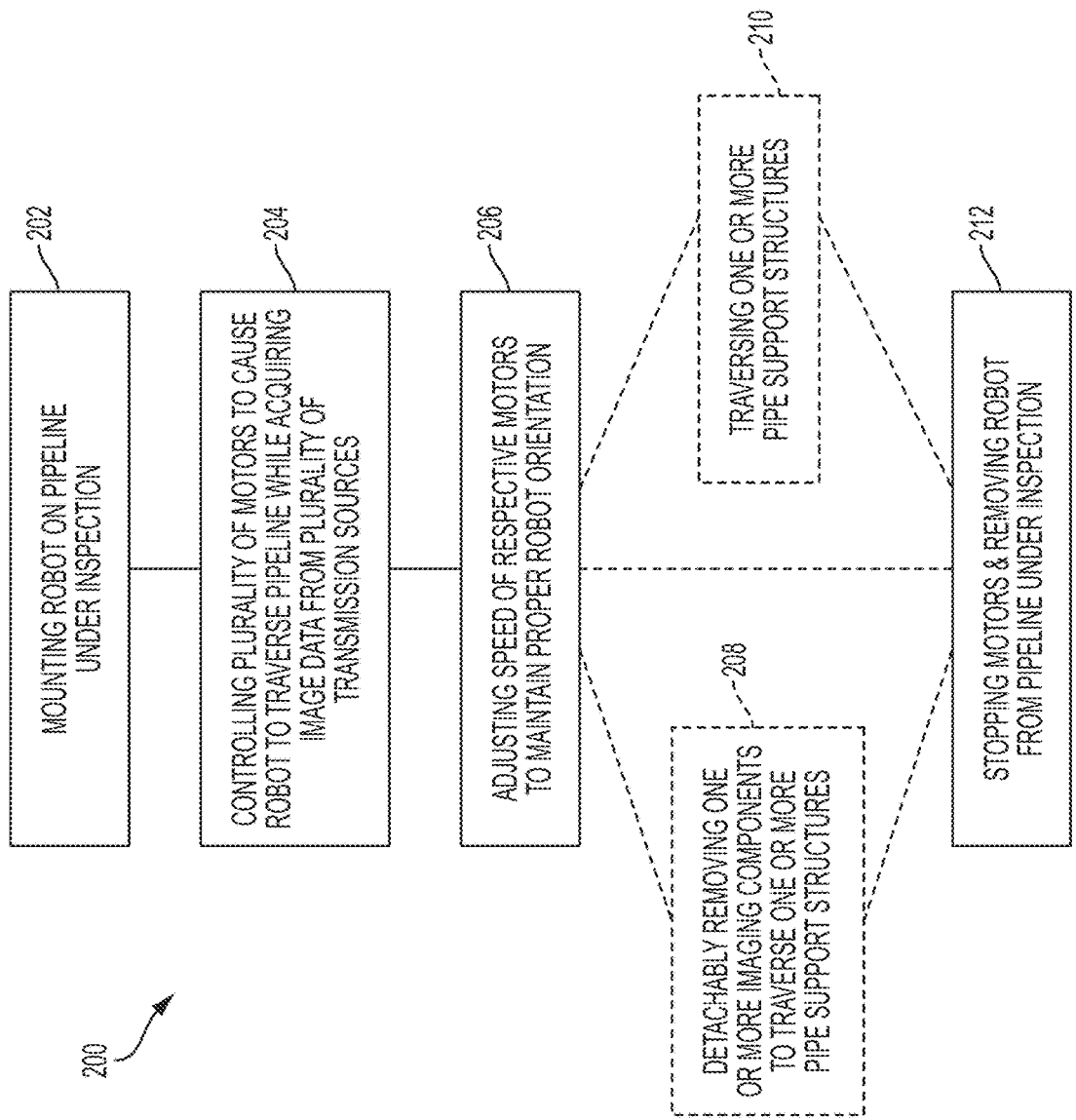
FIG. 2 is a block diagram illustrating example blocks of a method of operation for a pipeline inspection robot according to some embodiments of the present disclosure.

Turning now to FIG. 2, a method of operation for a pipeline inspection robot is shown at block 200. At block 202, the method includes mounting the robot on the pipeline under inspection. At block 204, the method includes controlling a plurality of motors to cause the robot to traverse the pipeline. In some embodiments, there may be four separate motors disposed to control each track of the robot. In yet another embodiment, two separate motors may control a left and right set or a front and back set of tracks on the robot.

At block 206, the method includes adjusting the speed of respective motors to maintain proper robot orientation above the pipeline under inspection. It is appreciated that these motors may be individually controlled in order to steer the robot and maintain proper orientation over the pipeline to facilitate imaging. Such control of directional movement may occur in response to one or more user interface inputs as described herein. Adjustments may be implemented in response to one or more feedback sources. For example, one or more sensors may be disposed on the robot (e.g. inclinometers) that provides feedback to various control systems and causes adjustments to take place. Additionally, as described above, one or more cameras may be disposed on the robot which allows a user to observe the inspection environment and steer the robot as needed. Moreover, additional sensors (e.g., optic, infrared, and the like) may be utilized to maintain centered positioning of the robot over the pipeline. Adjustments implemented in block 206 may be undertaken automatically in response to feedback processing, manually by the user, or by a combination of both.

At block 202, the method includes acquiring image data by capturing images from two or more azimuths. In some embodiments, a user may receive real-time image capture results which are transmitted between control box 150 and remote control 154. Further, a user may control the speed of the directional movement of the robot during a capture phase. The speed may be controlled automatically, or based on user interface inputs under control of a skilled operator contemporaneously viewing the displayed image capture results. For example, a user may determine how many milliseconds per line the detector captures, and then the software controls the speed of the robot accordingly. The image capture results may be displayed in a scrolling fashion to permit the operator to observe the contrast of the acquired image data. Accordingly, the operator is enabled to adjust the speed based on the observed contrast to obtain a desired level of contrast in the image data.

At block 208, the method may optionally include detachably removing one or more imaging components in order to traverse one or more pipeline support structures. For example, a robot may be required to pass a pipeline support which is contacting the pipeline on the underneath side of the pipeline. In example embodiments where one or more transmission sources or detectors may be disposed in areas which would impact such supports, embodiments may provide a user with a quick means (e.g. quick release bolts, tabs, picatinny rail mounts, etc.) to detach a component and allow the robot to traverse the impacted area, and then reattach the component for continued inspection.

Alternatively, at block 210, the method may include traversing one or more pipe support structures while continuing the inspection scanning. It is notable that in this embodiment, the imaging components are disposed and configured such that the multiple scanning angles may be imaged while traversing a pipe support structure. Such a capability greatly increases the efficiency of a scan and has not been previously available in prior devices.

At block 212, the method may include stopping the motors and removing the robot from the pipeline under inspection. This deactivation may also include the deactivation of the one or more transmission sources while stopping of the directional movement of the robot, and may occur in response to one or more user interface inputs as described above.

Figure 3A:
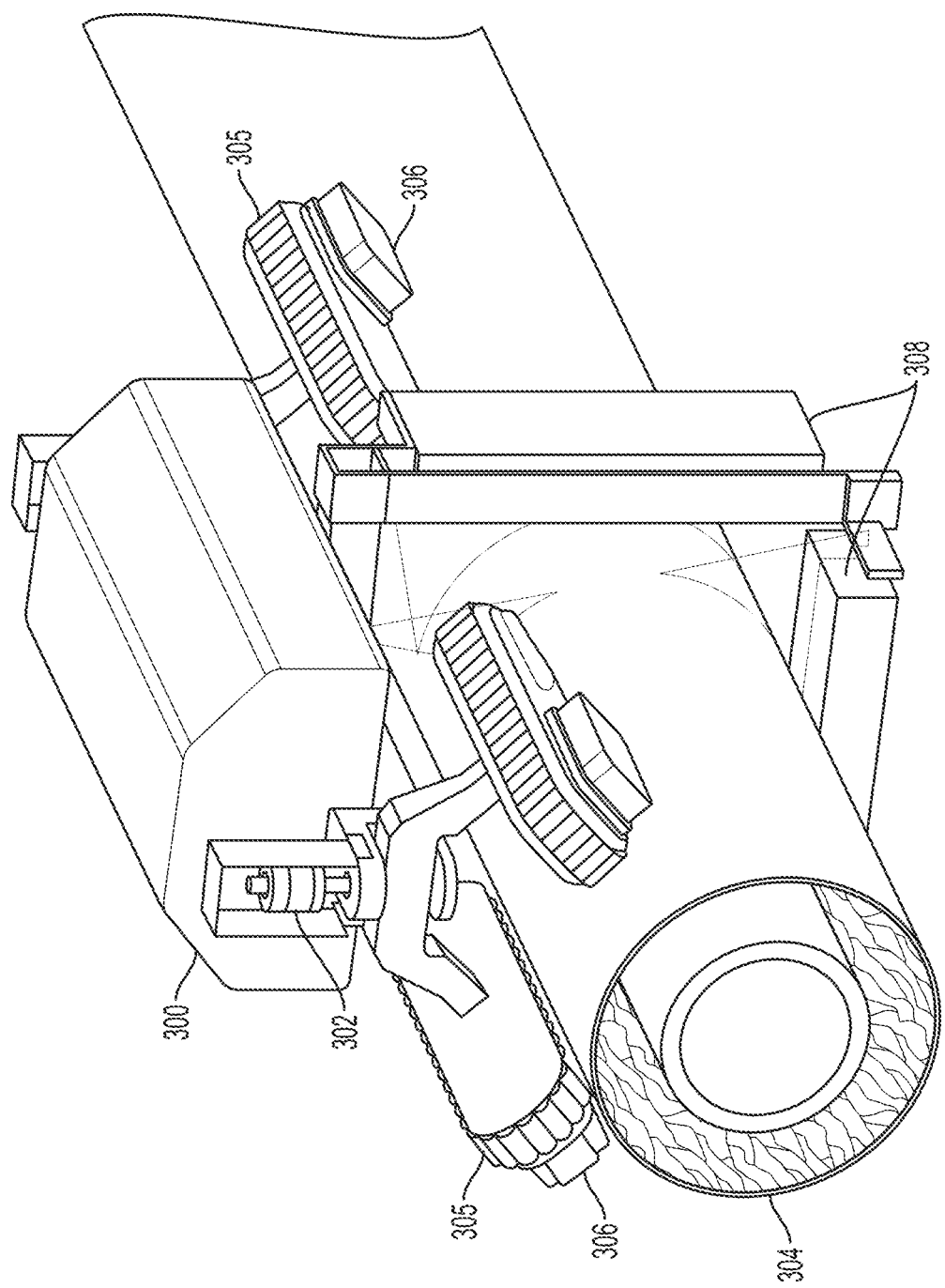
FIG. 3A is a perspective view of a pipeline inspection robot according to some embodiments of the present disclosure.

Turning now to FIG. 3A and FIG. 3B and referring generally thereto, an embodiment of a pipeline inspection robot may be configured with tracks 305 for traversing pipeline 304. In the illustrated embodiment, each of the tracks 305 may have an independent motor 306 to control speed and direction of the individual track 305. A pair of axle position encoders 302 may provide an axle angle data to a controller inside control box/housing component 300, which individually controls motors 306 and may function to automatically level and/or center the robot on top of the pipeline 304.

In addition to motion control hardware and power supplies and other aspects described with respect to FIG. 1, control box 300 may house one or more X-ray tubes, such as a pair of 60 kV 12 W X-ray tubes. These tubes serve as radiation sources 310, as do additional radiation sources 310 provided on a downwardly extended member 312. Together, these radiation sources 310 produce X-ray beams 308 along more than one azimuth. For example, the sources 310 are arranged so that the beams 308 are directed along tangents to a circle that resides inside the insulation and/or wall of the pipeline 304. A pair of linear detectors 308 are arranged on perpendicular members that extend down beside and underneath the pipeline 304 to receive the radiation from the beams, and each sensor array of each detector is divided into two sensor array sections 314 and 316 that produce separate imaging streams so that four images are captured contemporaneously. In the illustrated embodiment, the linear detector was selected which has an 800 micron pixel pitch in order to obtain sufficient resolution and sensitivity for the current embodiment, however other types of detectors may be utilized which provide performance suitable for the needs of the particular project. Each image stream provides a side view of a quadrant of the insulated pipeline 304. Although four beams, four azimuths, and four array sections are shown, it should be understood that other embodiments may have more or less (e.g., 2) azimuths, beams, and array sections depending on particular inspection needs.

It is noted that embodiments have one or more of the perpendicular members on which the linear detectors are arranged may quickly detach from and reattach to the robot to permit traversal of a support member of the pipeline 304 as discussed above. For example, the member that supports the linear detector arranged beneath the pipeline may be reattachably detachable so that a pipeline support member may be cleared during traversal of the robot or so that the robot may be removed from the pipeline 304. Alternatively or additionally, the member that extends down beside the pipeline may detachably detach form the robot, which accomplishes removal of both detectors. In alternative embodiments, detectors 308 and sources 310 may be configured such that the robot may traverse support members without stopping the inspection scanning.

Figure 4:
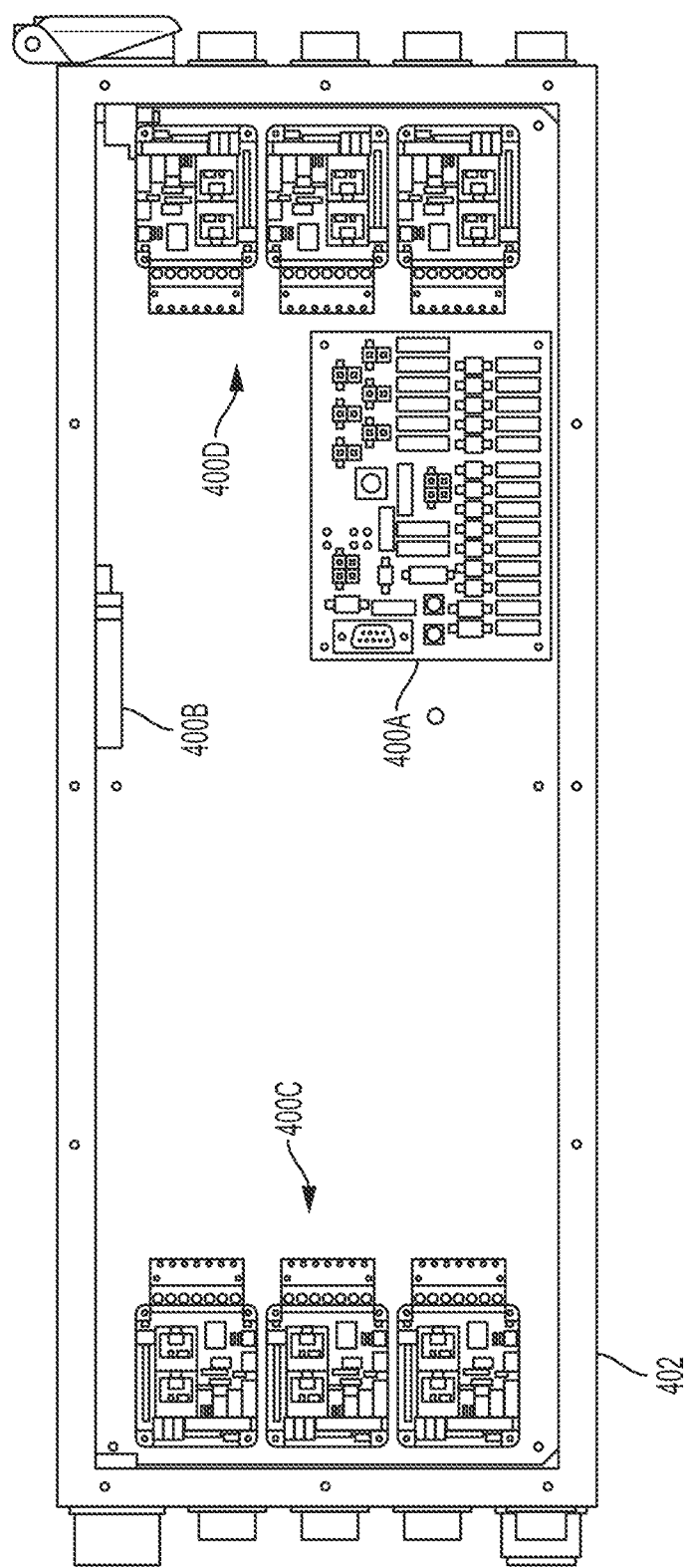
FIG. 4 is a schematic of internal component of a data interface unit of a pipeline inspection robot according to some embodiments of the present disclosure.
Figure 6:
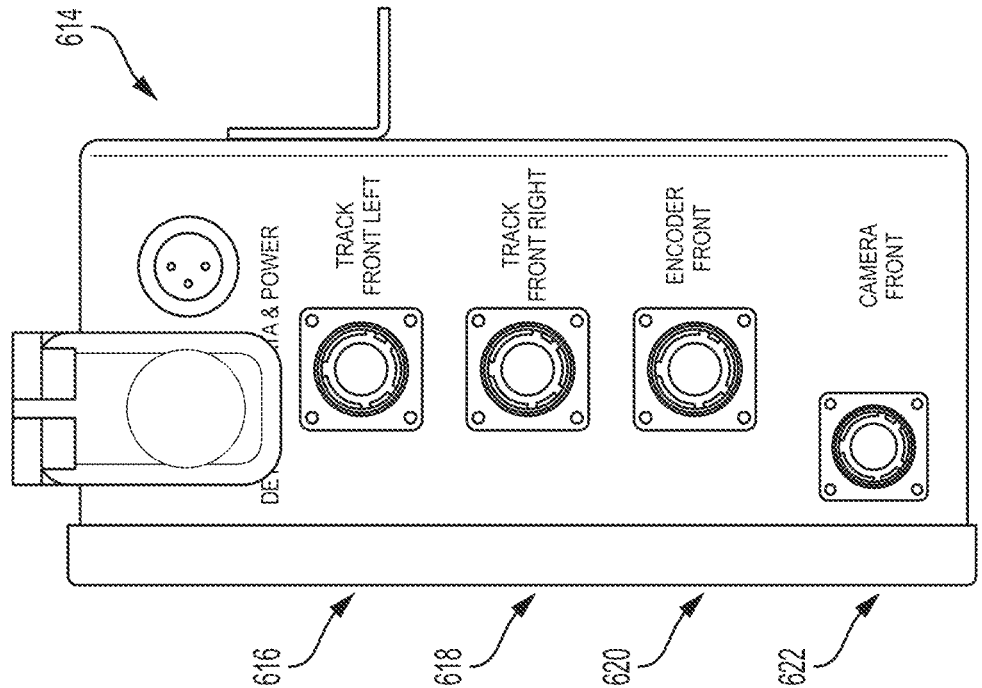
FIG. 6 is a schematic of additional external components of a data interface unit of a pipeline inspection robot according to some embodiments of the present disclosure.
Figure 5:
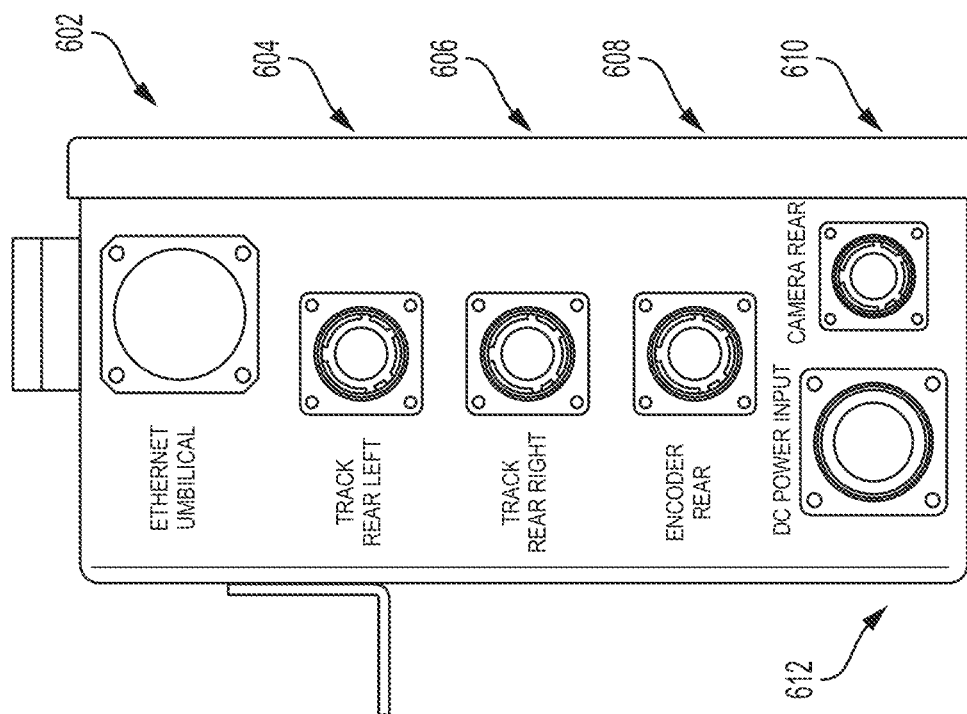
FIG. 5 is a schematic of external components of a data interface unit of a pipeline inspection robot according to some embodiments of the present disclosure.
Figure 7:
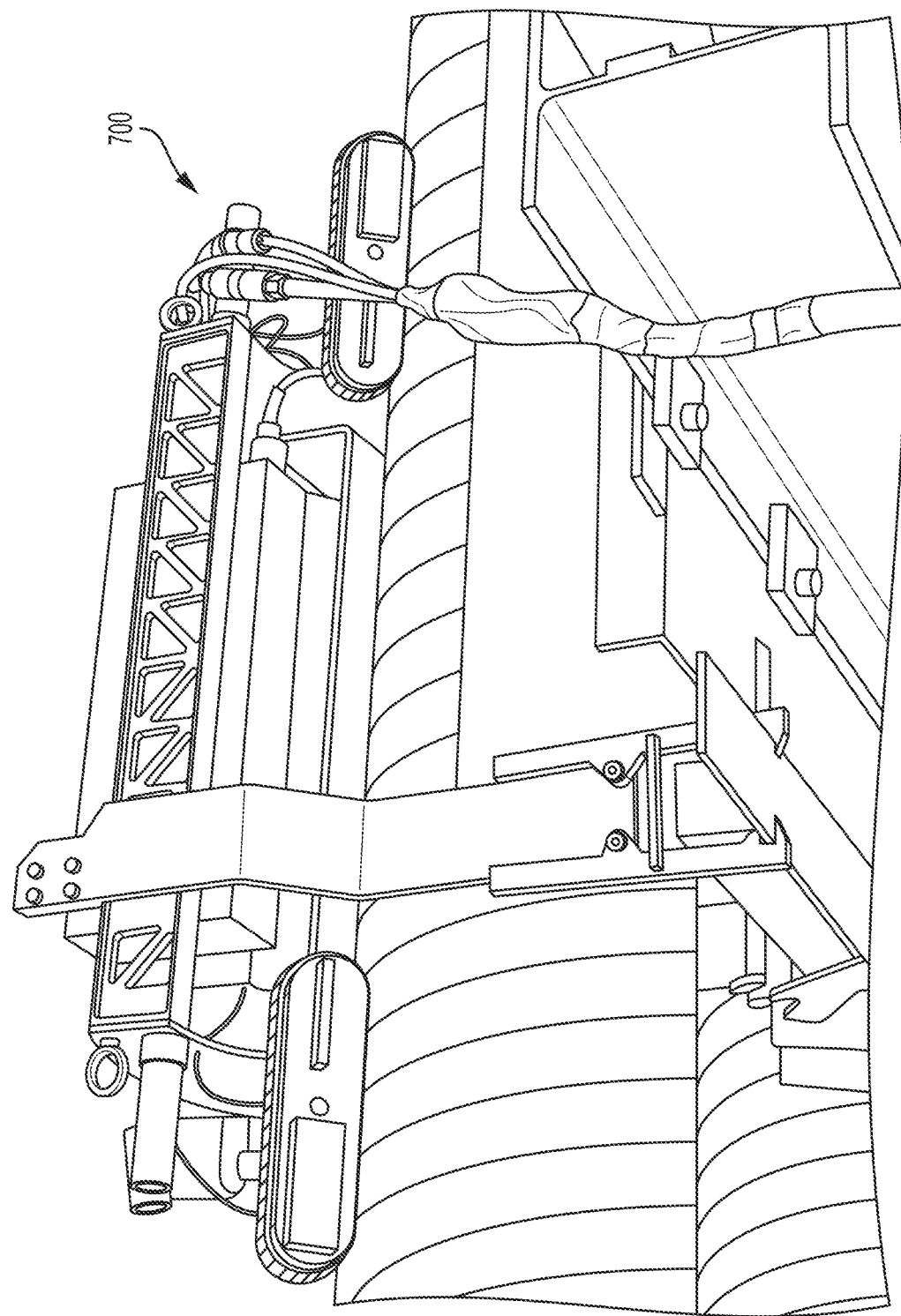
FIG. 7 is a perspective view of a cable connection between remote control equipment and a pipeline inspection robot according to some embodiments of the present disclosure.
Figure 8:
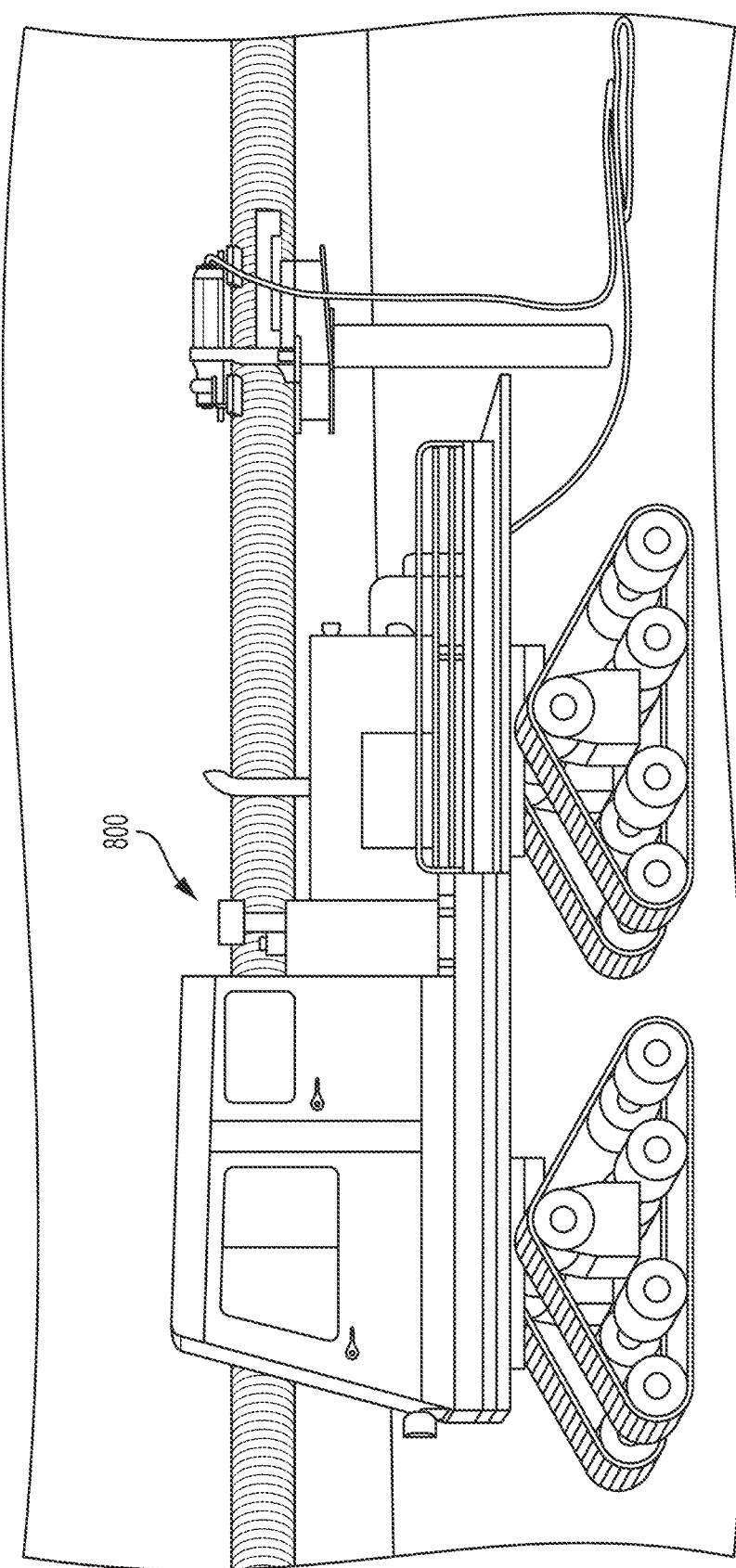
FIG. 8 is a perspective view of an arrangement of remote control equipment connected to a pipeline inspection robot according to some embodiments of the present disclosure.

FIG. 4 provides a schematic of some of the internal components, specifically PCB interconnect board 400A, inclinometer 400B, and motor controllers 400C-400D, of data interface unit 402, which may correspond to a part of control box 100 (see FIG. 1). It is appreciated that the illustrated components may be separated or combined with the functionality of other control/processing components. For example, a single processing unit may be provided which handles all of the control processing and interconnection of the component parts of the robot. The arrangement of these components corresponds to the arrangement of external components shown in FIGS. 5 and 6. For example, one rear end of the data interface unit has ports for an Ethernet umbilical 602, a track rear left control cable 604, a track rear right control cable 606, an encoder rear signal line 608, a camera rear signal line 610, and a DC power input 612. Additionally, an front end of the data interface unit has ports for a detector data and power connection 614, track front left control cable 616, a track front right control cable 618, an encoder front signal line 620, and a camera front signal line 622. A cable bundle 700 (see FIG. 7) provides signal exchange between the robot and a vehicle 800 (see FIG. 8) housing remote control equipment, such as a robot movement control screen and an image acquisition screen. It is envisioned that other embodiments may have wireless communication between the data interface unit and the remote control equipment. Further, one or more power sources may be located onboard the robot to further facilitate wireless use.

Figure 9:
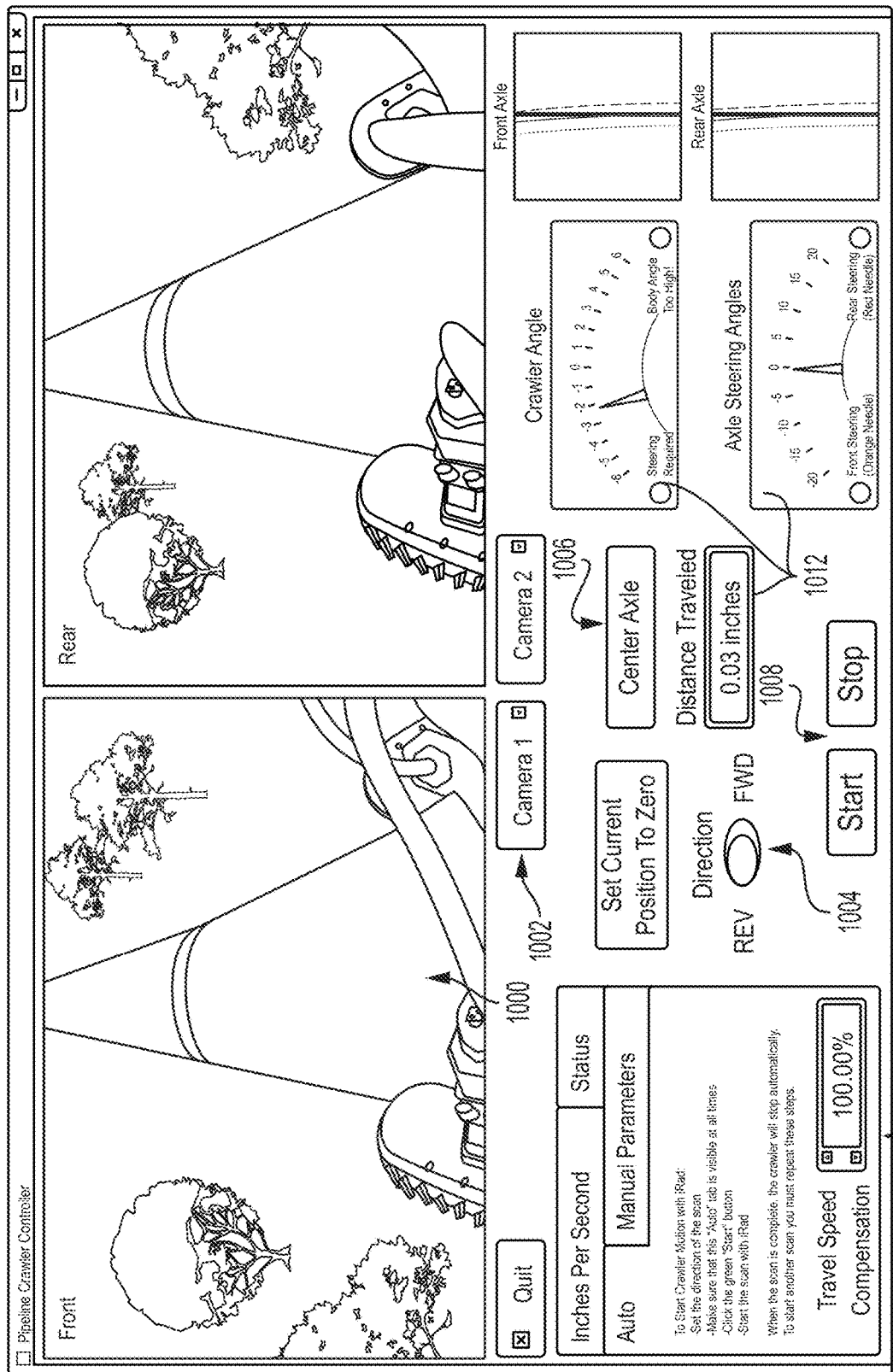
FIG. 9 is a screenshot illustrating user interface components for controlling movement of a pipeline inspection robot according to some embodiments of the present disclosure.

Turning to FIG. 9, user interface components for controlling movement of a pipeline inspection robot may have one or more display regions 1000 to display video streams of the inspection area and controls 1002 for turning the streams and/or corresponding cameras on and off. These display areas/cameras may be oriented in a plurality of directions. In the illustrated embodiment a front and rear view are shown. It is appreciated that other views and cameras may be available, e.g. looking directionally left, right, and downward at different points on the robot. Another control 1004 governs forward or reverse direction of travel of the robot, while control 1006 permits the operator to re-center an axle of the robot. Controls 108 permit the operator to start and stop the movement of the robot, while additional controls 1010 allow the operator to control speed of the robot, check status of the robot, configure manual inputs, and/or configure an automated mode that allows the operator to control the robot from a mobile device. Display regions 1012 provide data to the operator, such as distance travelled, crawler angle, and axle steering angles. It is appreciated that any additional controls to implement the functionality described herein may also be provided. For example, the cameras described above may be useful to an operator to help move the robot and maintain the spatial orientation of the robot in order to capture effective imaging data. In some embodiments such assistance to a user may be provided with other types of sensor data (e.g. electromagnetic imaging such as IR, Radar, and the like, ultrasound, etc.). These sensor-based assistance measures may utilize processing circuitry discussed above and provide feedback signals to steer the robot automatically. Additionally, and alternatively, the feedback may be provided to a user interface in a manner that allows a user to monitor conditions and data from said sensors. It is further appreciated that each of these methods may be utilized individually or in combination to facilitate the functionality of the robot.

Figure 10:
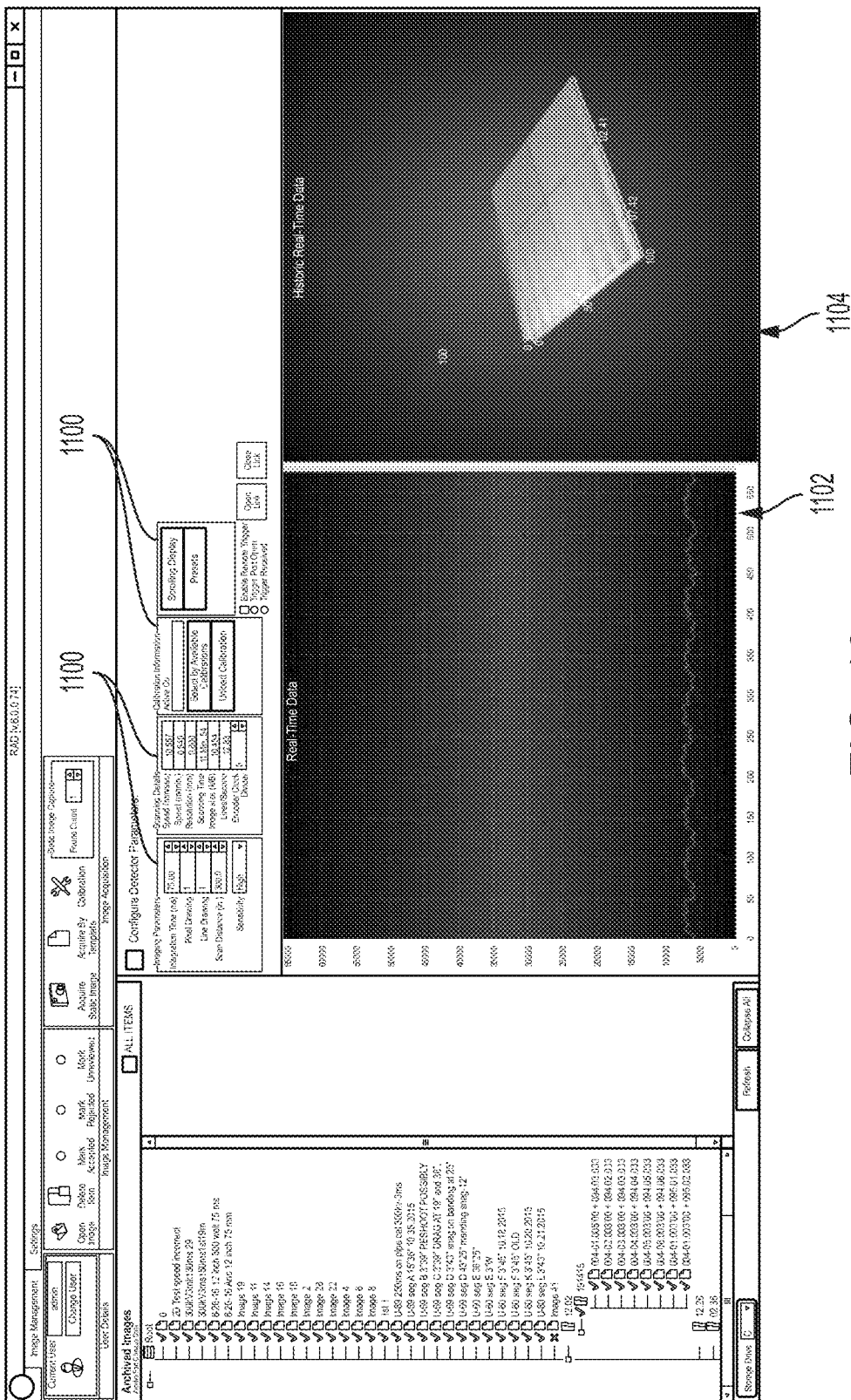
FIG. 10 is a screenshot illustrating user interface components for controlling acquisition of image data by a pipeline inspection robot according to some embodiments of the present disclosure.
Figure 11:
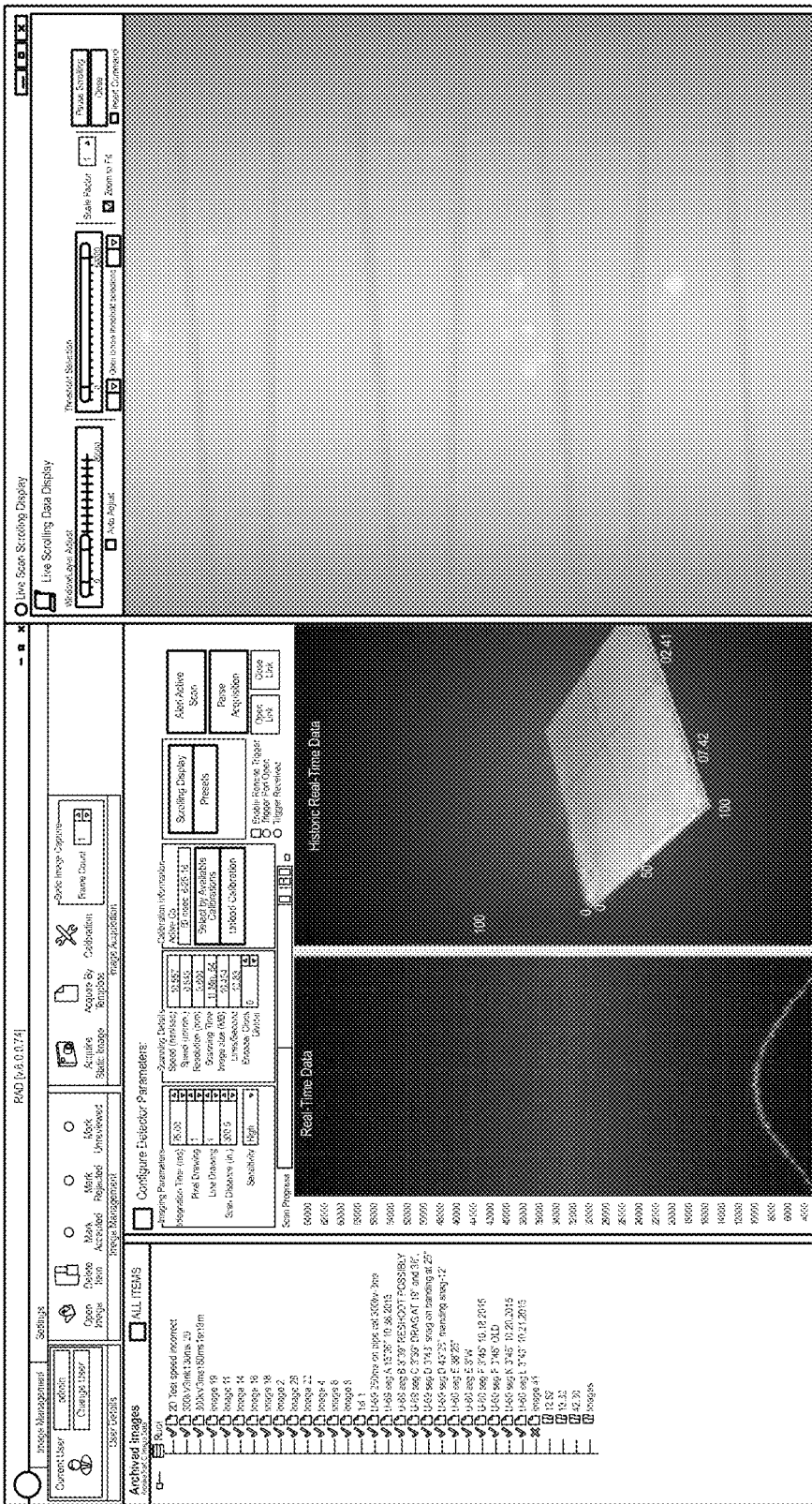
FIG. 11 is a screenshot illustrating display of a static image formed of image data acquired by a pipeline inspection robot according to some embodiments of the present disclosure.

Turning now to FIG. 10, user interface components for controlling image data acquisition by the robot include inputs for imaging parameters, scanning details, calibration information, and scrolling display configuration. Display regions 1102 and 1104 provide a live energy line and a waterfall plot. In scrolling mode, the image is displayed as it is acquired. Once the acquisition is complete, the image is displayed in the image viewer window 1200 (see FIG. 11).

Figure 12:
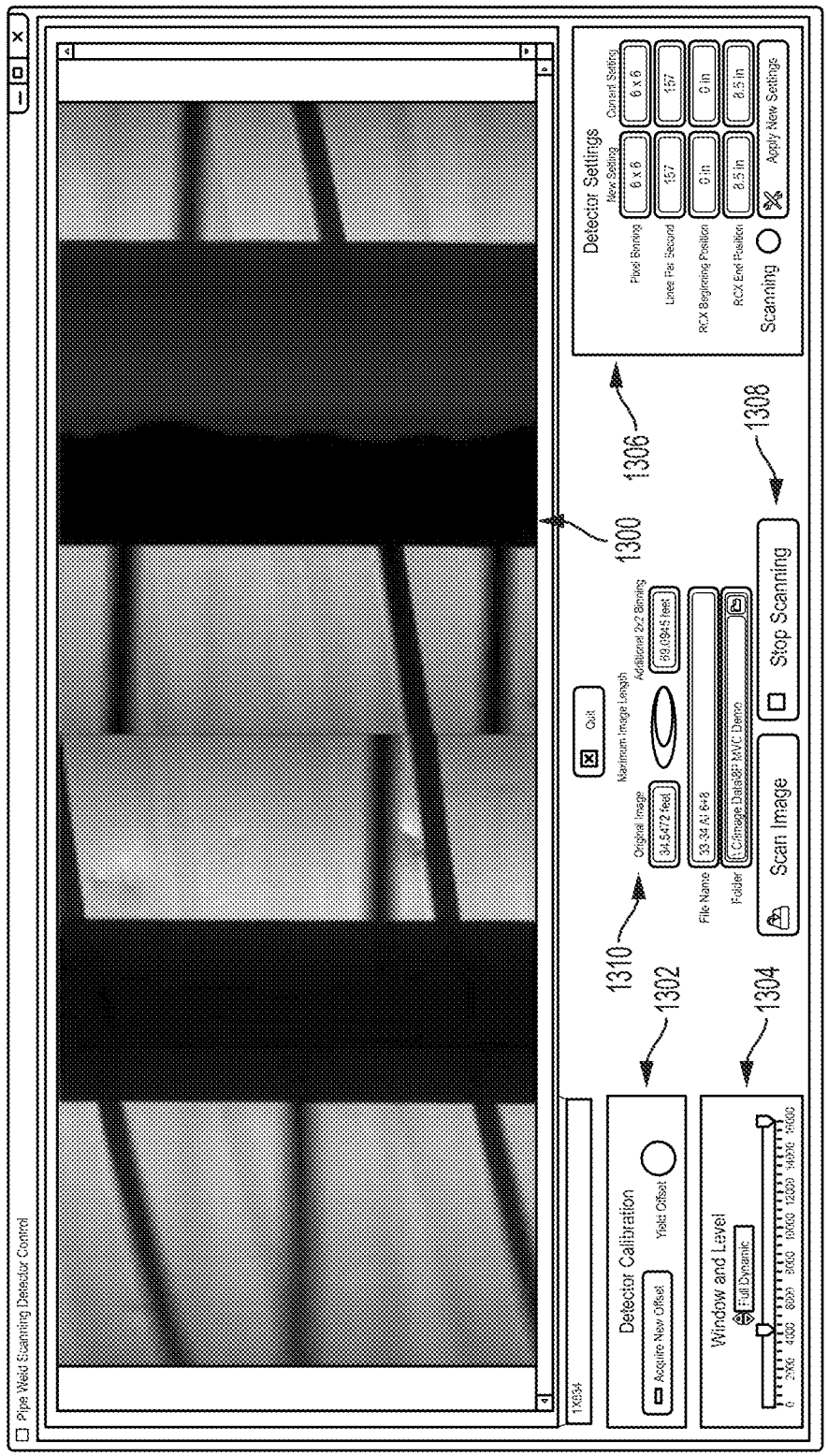
FIG. 12 is a screenshot illustrating user interface components for performing automated scan by a pipeline inspection robot according to some embodiments of the present disclosure.
Figure 13:
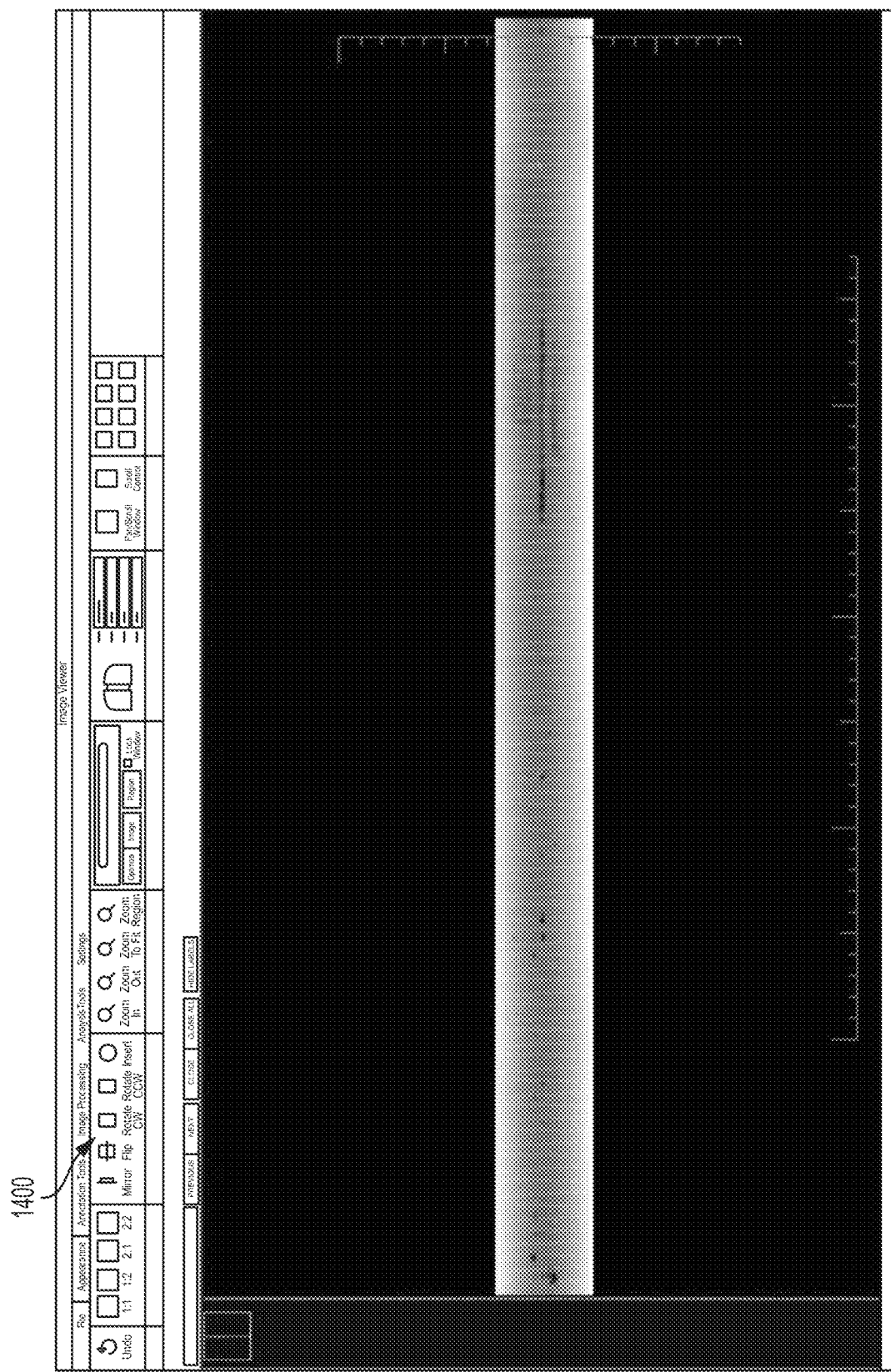
FIG. 13 is a screenshot illustrating user interface controls for processing of a static image formed of image data acquired by a pipeline inspection robot according to some embodiments of the present disclosure.
Figure 14:
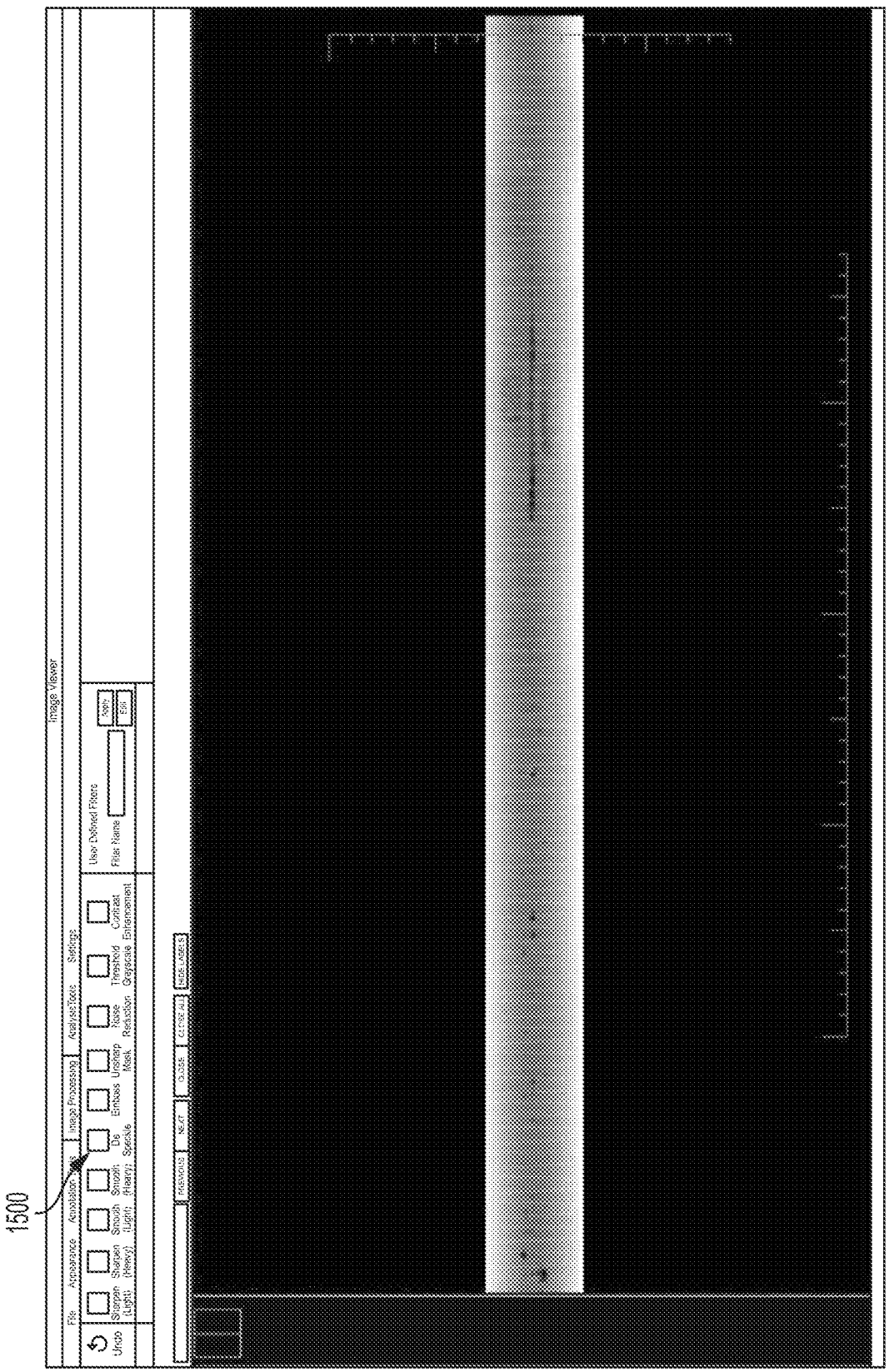
FIG. 14 is a screenshot illustrating user interface controls for additional processing of a static image formed of image data acquired by a pipeline inspection robot according to some embodiments of the present disclosure.
Figure 15:
FIG. 15 is a screenshot illustrating application of a filter to a static image formed of image data acquired by a pipeline inspection robot according to some embodiments of the present disclosure.

Turning now to FIG. 12, an alternative or additional user interface may be provided to assist in the control of the image capture devices. A scrolling display region 1300 provides a scrolling display of the image data as it is acquired. Detector calibration control 1302 may be used to calibrate the detectors, and a window/level control 1304 may be used to adjust brightness and contrast of the images (which may include adjusting the speed of the robot to allow for more or less exposure on a particular area of pipe). Detector settings may be observed and controlled by component 1306, and a scan may be started or stopped by controls 1308. In the detector settings window a user may change various settings to optimize the system. For example, a user may change Pixel Binning settings to combine pixels together which may increase signal sensitivity but decrease resolution. Lines per second settings allows a user to control the speed of acquisition. RCX beginning position and End position settings allows a user to choose a section of detector to use. Control 1310 may specify a length of the scan, which may cause the scan to end automatically once the specified length of traversal is completed.

Figure 16:
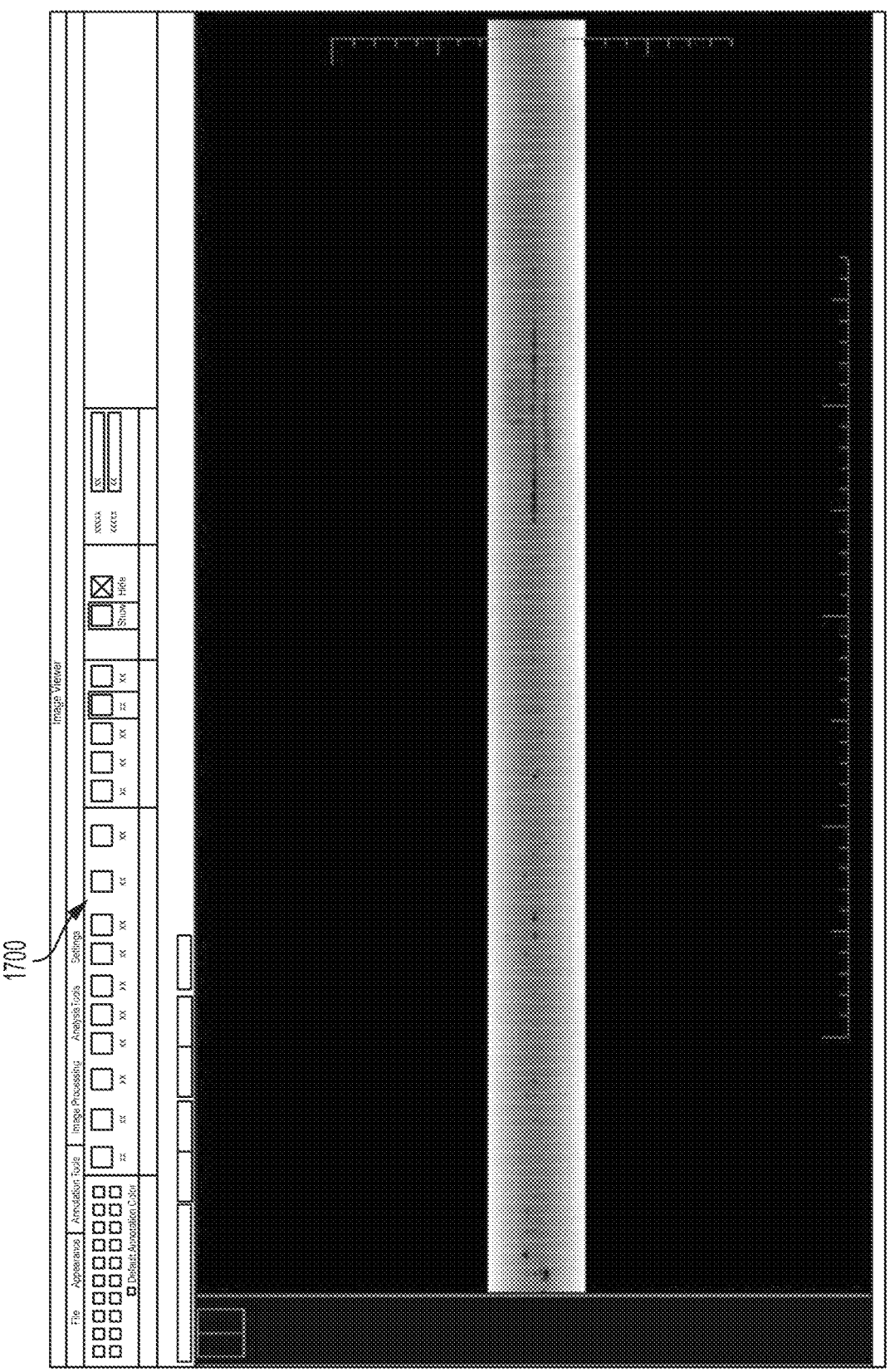
FIG. 16 is a screenshot illustrating user interface controls for further processing of a static image formed of image data acquired by a pipeline inspection robot according to some embodiments of the present disclosure.

Turning now to FIGS. 13-16 and referring generally thereto, the user interface may have various controls for displaying and processing a static image after the image data is acquired. In the illustrated embodiments, the static image is a 2D image that may have different tools and filters applied to change the way the image is viewed and/or oriented without changing the basic characteristics of the image. In some instances the image may be viewed in negative or positive modes. For example, under an appearance tab, various controls 1400 enable a user to window/level, invert, rotate, and adjust the image for presentation. A user may also perform a spatial calibration to measure indications in the image. Grayscale intensity readings in different regions may also allow a user to calculate density differences. Additionally, under an image processing tab, various controls 1500 enable a user to apply various filters to the image, such as an emboss filter, as shown in FIG. 16. Also, under an annotation tab, various controls 1700 enable a user to choose measurement units and annotate the image. As shown in FIG. 16 areas of higher density (the lighter areas) which are the lead numbers and image quality indicators and areas of lower density (the dark areas) indicating pitting in the pipe wall. The evenly spaced lighter lines are the overlapped seams in the spiral wrapped insulation jacketing. The images provided herein are of spiral wrapped insulated pipe and the dark areas displayed indicate pitting in the pipe wall, the darker the area the more wall loss there is. The perpendicular lighter bands at regular intervals are the overlapped seams in the insulation wrapping. The plot in FIG. 16 allows the user to measure grayscale levels along the line giving the user to determine the amount of wall loss.

Figure 17:
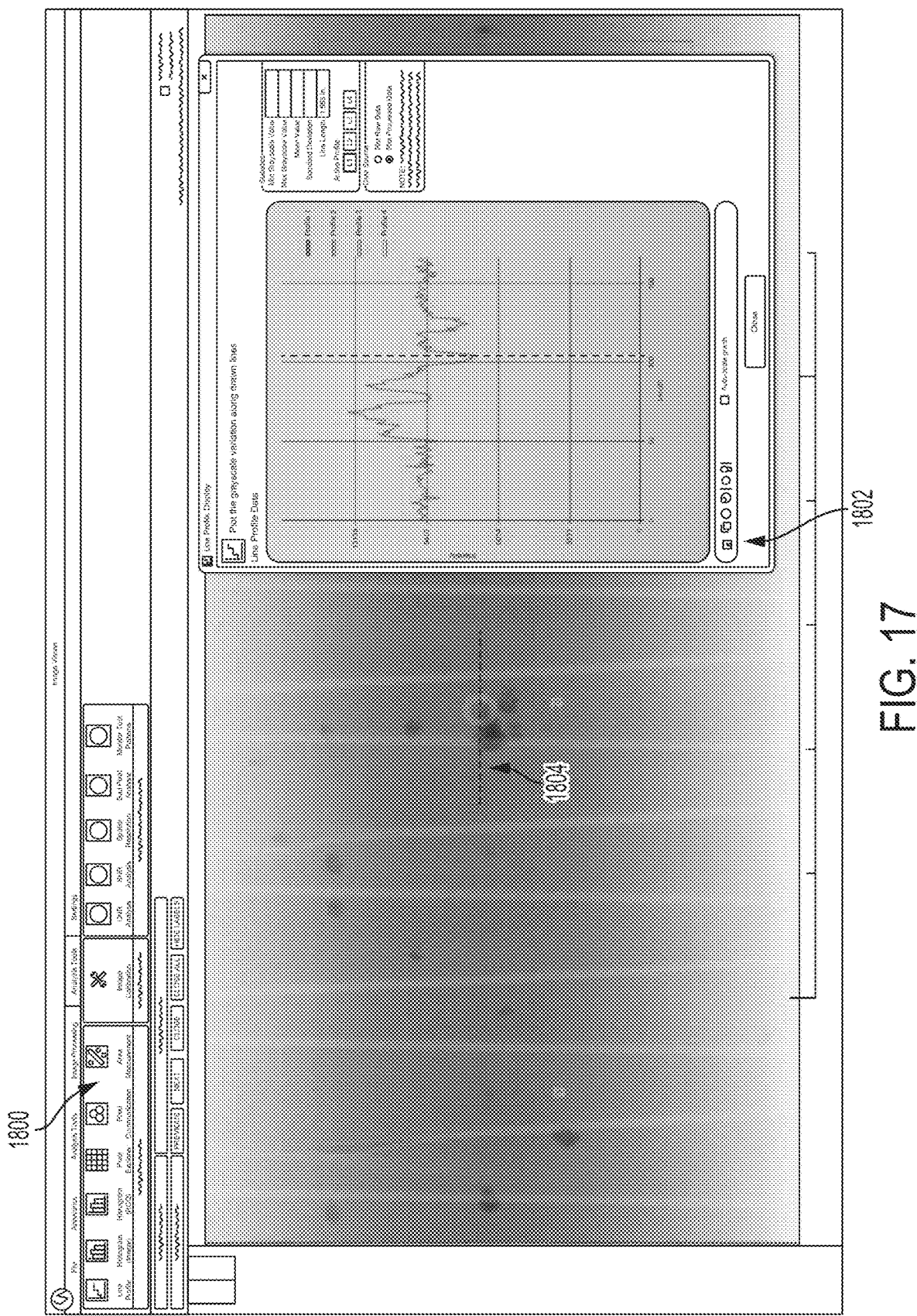
FIG. 17 is a screenshot illustrating user interface controls for analyzing a static image formed of image data acquired by a pipeline inspection robot according to some embodiments of the present disclosure.

Referring finally to FIG. 17, the user interface may also have various controls 1800 under an analysis tab that enable a user to analyze the image. For example, the user may generate a plot 1802 of greyscale levels along a profile line 1804. Alternatively or additionally, an area measurement tool may enable the user to measure an area of the image.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1 and 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A pipeline inspection robot comprising:
   a housing compartment including one or more drive control systems and imaging control systems;
   a plurality of traversal components configured to contact a pipe under inspection and to support the pipeline inspection robot on an external surface of the pipe under inspection;
   a plurality of motors configured to drive the plurality of traversal components, wherein each motor of the plurality of motors is controlled separately by the one or more drive control systems; and
   at least one sensor configured to provide positional data of the pipeline inspection robot to the one or more drive control systems, wherein the one or more drive control systems controls at least one of direction, speed, and orientation of the pipeline inspection robot on the external surface of the pipe under inspection based on the positional data from the at least one sensor, and
   wherein the one or more drive control systems are configured to control the speed of the pipeline inspection robot on the pipe under inspection based on an acquisition speed of imagining components attached to the pipeline inspection robot.

2. The pipeline inspection robot of claim 1, wherein the plurality of traversal components includes four wheels, and wherein the plurality of motors comprises four separately controlled motors each configured to drive an individual of the four wheels.

3. The pipeline inspection robot of claim 1, wherein the at least one sensor includes one or more of:
   at least one inclinometer; and
   at least one axle position encoder.

4. The pipeline inspection robot of claim 1, wherein controlling at least one of direction, speed, and orientation of the pipeline inspection robot on the external surface of the pipe under inspection based on the positional data from the at least one sensor includes maintaining relative orientation while the pipeline inspection robot traverses the length of a pipeline.

5. The pipeline inspection robot of claim 4, wherein maintaining relative orientation includes centering the pipeline inspection robot on the pipeline.

6. The pipeline inspection robot of claim 4, wherein maintaining relative orientation includes leveling the pipeline inspection robot with the pipeline.

7. The pipeline inspection robot of claim 1, wherein at least one of the plurality of traversal components is disposed at an angle with respect to the housing compartment of the pipeline inspection robot.

8. The pipeline inspection robot of claim 1, further comprising:
   at least one mounting component configured to attach one or more imaging components configured to capture imaging data for the pipe under inspection.

9. The pipeline inspection robot of claim 8, wherein the pipeline inspection robot is configured to traverse a pipe support while capturing the image data.

10. The pipeline inspection robot of claim 8, wherein the one or more drive control systems are configured to control the speed of the pipeline inspection robot on the pipe under inspection to match the speed of the pipeline inspection robot traversing the pipe under inspection to the acquisition speed of the one or more imaging components.

11. The pipeline inspection robot of claim 8, wherein the at least one mounting component attaches the one or more imaging components configured to allow the pipeline inspection robot to acquire images from a plurality of azimuths.

12. The pipeline inspection robot of claim 11, wherein the at least one mounting component includes at least one perpendicular extension having a proximal end near the pipeline inspection robot and a distal end, said perpendicular extension configured to mount the one or more imaging components.

13. The pipeline inspection robot of claim 12, wherein the one or more imaging components includes a first image detector.

14. The pipeline inspection robot of claim 12, further comprising a second extension attached to the distal end of the perpendicular extension, the second extension configured to hold a second detector.

15. The pipeline inspection robot of claim 12, wherein the at least one perpendicular extension is configured to mount one or more image capture transmission sources.

16. The pipeline inspection robot of claim 8, further comprising a quick release mounting component configured to releasably attach at least part of a mounting component to remove one or more imaging components.

17. A method for inspecting an above-ground pipeline, said method comprising:
  mounting an inspection crawler on a pipeline under inspection, said inspection crawler including a plurality of motors configured to drive a plurality of traversal components in order to move the inspection crawler;
  individually controlling the plurality of motors based, at least in part, on input received from at least one sensor to cause the inspection crawler to traverse the pipeline, wherein the at least one sensor measures positional data of the inspection crawler relative to the pipeline;
  adjusting the speed of one or more of the plurality of motors while traversing the pipeline to maintain spatial orientation of the inspection crawler in order to capture image data, using at least one imaging sensor;
  controlling the speed of the inspection crawler on the pipeline under inspection, using one or more drive control systems, based on an acquisition speed of the at least one imaging sensor; and
  stopping the plurality of motors and removing the inspection crawler from the pipeline when the inspection image data is captured.

18. The method of claim 17, wherein adjusting the speed of one or more of the plurality of motors matches the speed of the inspection crawler traversing a pipe under inspection to the acquisition speed of the at least one imagining sensor.

19. The method of claim 17, wherein the plurality of traversal components includes four wheels, and wherein the plurality of motors comprises four separately controlled motors each configured to drive an individual of the four wheels.

20. The method of claim 17, wherein the at least one sensor includes one or more of:
  at least one inclinometer; and
  at least one axle position encoder.

* * * * *